United States Patent [19]

Porucznik et al.

[11] Patent Number: 5,239,921
[45] Date of Patent: Aug. 31, 1993

[54] BALANCE MECHANISM FOR A PRESS MACHINE

[75] Inventors: Paul Porucznik, Oxfordshire; Christopher F. Cheers; Brian Hill, both of Wiltshire, all of United Kingdom

[73] Assignee: CarnaudMetalbox PLC, Worcester, England

[21] Appl. No.: 8,703

[22] Filed: Jan. 25, 1993

Related U.S. Application Data

[62] Division of Ser. No. 695,915, May 6, 1991, Pat. No. 5,201,267.

[30] Foreign Application Priority Data

May 16, 1990 [GB] United Kingdom ............... 9010918

[51] Int. Cl.$^5$ ............................................. B30B 15/14
[52] U.S. Cl. ..................................... 100/48; 100/282; 100/299; 74/591; 74/604
[58] Field of Search ............... 100/48, 282, 292, 299; 74/591, 603, 604

[56] References Cited

U.S. PATENT DOCUMENTS

| | | | |
|---|---|---|---|
| 2,808,736 | 10/1957 | Jackson | 74/604 |
| 3,808,912 | 5/1974 | Vorhees | 74/604 |
| 4,509,378 | 4/1985 | Brown | 74/591 |

OTHER PUBLICATIONS

"Computer-Aided Design of a Retrafit Package to Reduce Shaking Forces in a Metal Can Body Maker Machine" M. R. Askari and T. H. Davies Cont. Westminster, London (Sep. 24, 1988), Organized by Institution of Mechanical Engineers.

Primary Examiner—Philip R. Coe
Assistant Examiner—Randall E. Chin
Attorney, Agent, or Firm—Nixon & Vanderhye

[57] ABSTRACT

Three balance mechanisms for a press machine are described. The first balance mechanism for a press machine comprises a balance weight 91 mounted on a crankshaft 86 of the press machine, a balance weight 92 mounted on a balance mechanism shaft 93, a motor for rotating the shaft 93 and a control system for the motor. The control system ensures that the balance mechanism shaft 93 rotates in the opposite direction to, but at the same speed as, crankshaft 86. The balance weights 91 and 92 balance the primary shaking forces which arise in the press machine along the axis of movement of its ram 83. In the second balance mechanism, balance weights are mounted on two separate shafts rotated by a motor and connected by a gear mechanism. In the third balance mechanism, one balance weight is mounted on the crankshaft, another balance weight is mounted on a shaft rotated by a motor, and a further pair of balance weights are mounted on a pair of shafts rotated by a motor at twice crankshaft speed.

4 Claims, 11 Drawing Sheets

BALANCE MECHANISM FOR A PRESS MACHINE

This is a division of application Ser. No. 07/695,915, filed May 6, 1991 now U.S. Pat. No. 5,201,267.

BACKGROUND OF THE INVENTION

1. Field of the Invention

This invention relates to a balance mechanism for a press machine.

2. Discussion of Prior Art

To improve productivity and return on capital investment, the operating speed of press machinery, as well as other machinery, has been steadily increased over the years. As the speed increases, the greater acceleration of the moving parts gives rise to progressively greater shaking forces. These shaking forces are proportional to the square of the operating speed. The mass of moving parts can be reduced to some extent in order to reduce shaking forces, but reduced strength and stiffness can impair the quality of the components produced. Also, at very high speeds, extra strength and stiffness are required to withstand the extra load imposed by the high shaking forces.

The shaking forces may reduce accuracy of tool alignment and give rise to tool wear, and possibly tool damage by fatigue, leading to a reduction in product quality. Vibration may cause machine parts to resonate. Furthermore, vibrations transmitted to the ground can damage foundations and cause disturbance to nearby machines.

If further increases in speed are to be achieved, it is very important to reduce shaking forces. Shaking forces may be reduced by dynamic balancing and some prior art approaches to such balancing will now be described.

In general, in a machine having an oscillating member, there will be shaking forces and shaking moments. During each cycle of the machine, the shaking forces will vary in both magnitude and direction while the shaking moments will vary in magnitude. The shaking forces can be resolved into a horizontal force and a vertical shaking force.

The horizontal shaking force can be expressed as a Fourier series of sinusoidal shaking forces. In this series, there will be a fundamental component having a frequency which is equal to the frequency of oscillation of the oscillating member. There will also be harmonic components at frequencies which are equal to whole number multiples of the frequency of oscillation. The vertical shaking force may be expressed as a Fourier series of sinusoidal shaking forces in a similar manner.

The fundamental components of the Fourier series are known as the primary shaking forces. These primary shaking forces are usually the significant components of the shaking forces. The first harmonic components are known as the secondary shaking forces. Although usually much smaller in magnitude than the primary shaking forces, the secondary shaking forces can also be significant. Higher harmonic components are not usually significant. However, some machines generate secondary (or higher) shaking forces which are greater than the primary shaking forces.

In designing a balance mechanism, it is often essential to balance the primary shaking forces. Sometimes, it is acceptable if the secondary shaking forces or the shaking moments remain unbalanced. However, for some machines, it may be useful to balance secondary (or higher) shaking forces without balancing the primary shaking forces.

The analysis of shaking forces in a press machine for making can bodies is discussed in a paper entitled "The Computer-aided design of a retrofit package to reduce the shaking forces in a metal can bodymaker machine", by M R Askari and T H Davies. This paper was read at a conference entitled "High Speed Machinery", held at 1 Birdcage Walk, Westminster, London on Sep. 24, 1988 and organised by the Institution of Mechanical Engineers.

Figure 1:
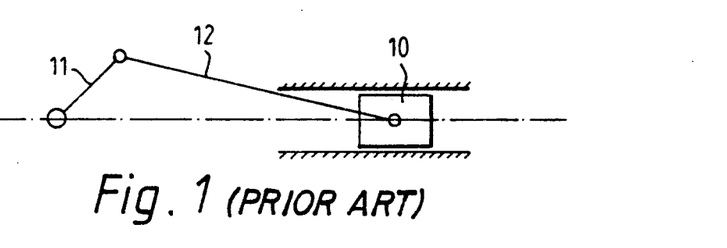
FIG. 1 is a sketch of a machine having a reciprocating weight.

Referring now to FIG. 1, there is shown a simple machine having a reciprocating member 10 mounted for sliding movement, a crankshaft 11 and a connecting rod 12. For simplicity, the connecting rod 12 is assumed to be lightweight. For a real machine, the weight of a connecting rod can be significant. The reciprocating movement of the member 10 gives rise to a horizontal shaking force. The movement of the reciprocating member 10 departs to some extent from simple harmonic motion and this departure may be understood from the following discussion. When the member 10 is at the extreme right hand end of its travel, the crankshaft 11 and connecting rod 12 are rotating in opposite directions. In contrast, when the member 10 is at the extreme left hand end of its movement, the crankshaft 11 and connecting rod 12 are rotating in the same direction. Consequently, the magnitude of the acceleration of member 10 will be slightly greater when it is at the extreme right hand end than when it is at the extreme left hand end of its movement. In contrast, if the member 10 were performing pure simple harmonic motion, the magnitude of the acceleration would be equal at both ends of the movement. It is this departure from simple harmonic motion that gives rise to the secondary shaking forces as well as the higher harmonic components.

Figure 2:
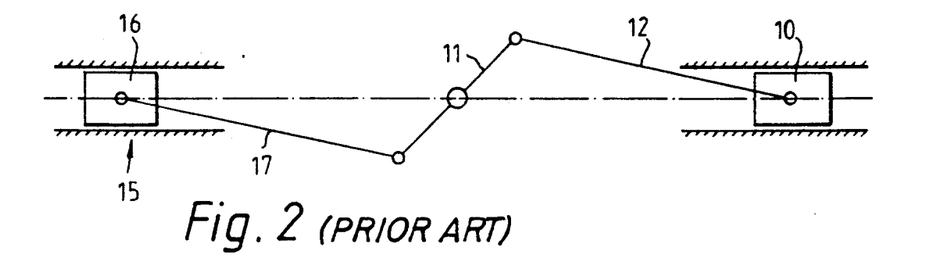
FIG. 2 is a sketch of the machine of FIG. 1 provided with a known balance mechanism.

Referring now to FIG. 2, there is shown a balance mechanism 15 for balancing the member 10. This balance mechanism 15 comprises a member 16 slidingly mounted for reciprocating movement on the opposite side of the crankshaft from the member 10. The member 16 is connected to the crankshaft 11 by a further lightweight connecting rod 17. The connecting rod 17 is mounted on the crankshaft 11 at a position which is axially spaced from the connecting 12. The reciprocating member 16 balances the primary shaking force as well as the secondary shaking force and higher harmonic components which arise due to the movement of the member 10. However, because the connecting rods 12 and 17 are axially spaced from each other, the balance mechanism introduces a shaking moment.

Figure 3:
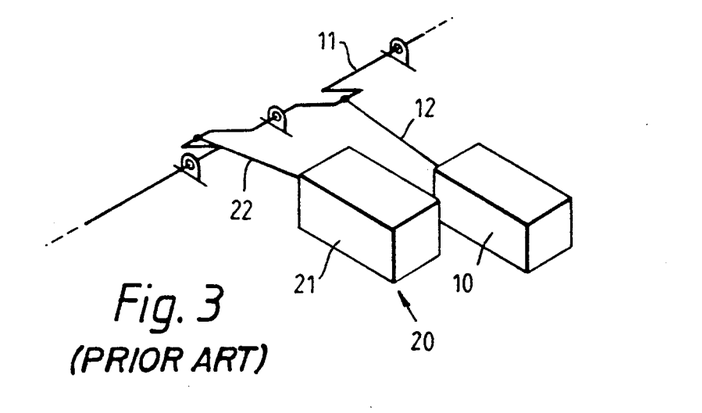
FIG. 3 is a sketch of the machine of FIG. 1 provided with another known balance mechanism.

Referring now to FIG. 3, there is shown another balance mechanism 20 for balancing the movement of the member 10. The balance mechanism 20 comprises a balance weight 21 mounted for sliding reciprocating movement on the same side of the crankshaft 11 as the member 10. The member 21 is connected to the crankshaft 11 by a lightweight connecting rod 22, and the connecting rods 12 and 22 are axially spaced from each other. In the balance mechanism 20, the member 21 balances the primary shaking force due to the movement of member 10. However, because both the members 10 and 21 are on the same side of crankshaft 11, they give rise to secondary shaking forces which are in phase with each other and, consequently, the balance mechanism 20 causes the secondary shaking forces to be doubled. Also, because the connecting rods 12 and 22 are axially spaced, the balance mechanism 20 gives rise to a shaking moment. If the shape of the connecting rods 12,22 were altered to bring the members 10,21 into line with each other, this would eliminate the shaking moment but it would introduce bending moments in the connecting rods.

Balance mechanisms of the type shown in FIGS. 2 and 3 suffer from various disadvantages. The masses of the additional moving members increase both the overall inertia of the machine and friction losses. This increases the required capacities of the drive motor, transmission, clutch, brake and flywheel. Of these, the increase in the braking requirement is usually the most important. For example, a high speed press must usually be able to stop in half a machine cycle to prevent tooling damage in the event of a workpiece becoming jammed. Also, when designing a balance mechanism of the type shown in FIGS. 2 or 3, it is often difficult to find a suitable location for the components of the balance mechanism.

In a type of balance mechanism known as a Lanchester balance mechanism, two or more balance weights are mounted eccentrically on shafts which are geared together. Three examples of this type of balance mechanism will now be described with reference to FIGS. 4 to 6.

Figure 4:
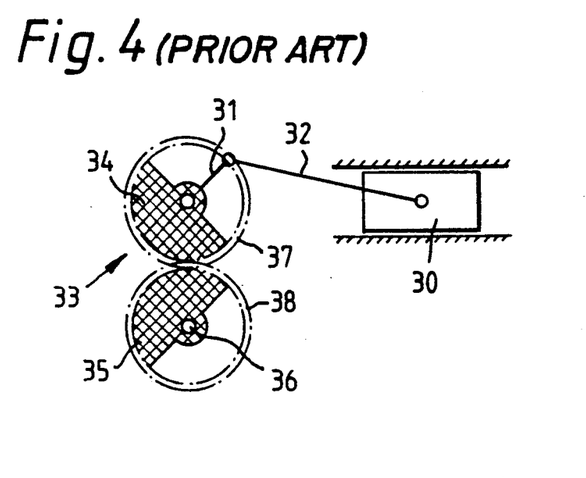
FIG. 4 is a sketch of a machine having a reciprocating member provided with a balance mechanism of the Lanchester type.

Referring now to FIG. 4, there is shown a machine having a member 30 mounted for reciprocating movement and driven from a crankshaft 31 via a lightweight connecting rod 32. This machine has a balance mechanism 33 comprising a balance weight 34 mounted eccentrically on the crankshaft 31 and a balance weight 35 mounted on a further shaft 36. The crankshaft 31 and the shaft 36 are connected together by gear wheels 37 and 38 so that they rotate in opposite directions and at the same speed. The balance weights 34 and 35 are equal. The balance weights 34 and 35 balance the primary shaking forces which arise due to the movement of the member 30. However, the secondary forces caused by the member 30 are not balanced and the balance weights 34 and 35 give rise to a shaking moment.

Figure 5:
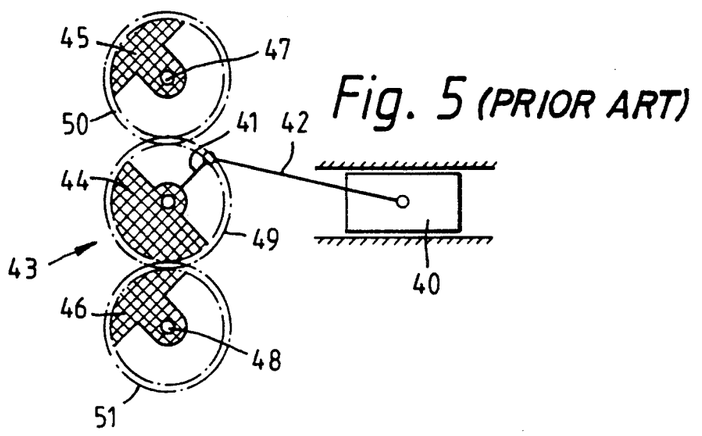
FIG. 5 is a sketch of another machine provided with a balance mechanism of the Lanchester type.

Referring now to FIG. 5, there is shown a machine having a member 40 mounted for reciprocating movement and driven by a crankshaft 41 via a lightweight connecting rod 42. The machine has a balance mechanism 43 which comprises a first balance weight 44 mounted eccentrically on crankshaft 41 and second and third balance weights 45 and 46 mounted eccentrically on a pair of shafts 47 and 48. The crankshaft 41 and shafts 47 and 48 are connected together by a set of gear wheels 49, 50 and 51 so that the shafts 47 and 48 rotate in the opposite direction to crankshaft 41. Each of the balance weights 45 and 46 has a mass equal to half the mass of balance weight 44. The balance mechanism 43 balances the primary shaking forces which arise due to the movement of member 40 without introducing a shaking moment. The secondary shaking forces remain unbalanced.

Figure 6:
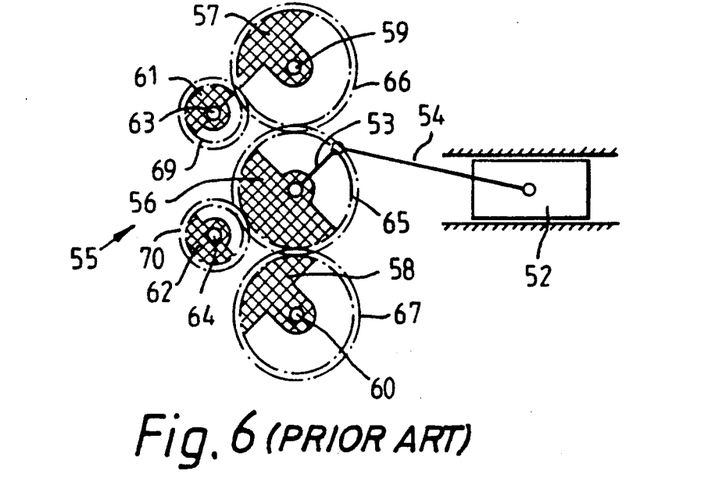
FIG. 6 is a sketch of a further machine provided with a balance mechanism of the Lanchester type.

Referring now to FIG. 6, there is shown a machine having a member 52 mounted for reciprocating movement and driven by crankshaft 53 via a connecting rod 54. The machine has a balance mechanism 55. The balance mechanism 55 comprises a balance weight 56 mounted eccentrically on crankshaft 53, a pair of balance weights 57 and 58 mounted eccentrically on a pair of shafts 59 and 60, and a further pair of balance weights 61 and 62 mounted eccentrically on a pair of shafts 63 and 64. The crankshaft 53 and shafts 59 and 60 are provided with gear wheels 65, 66 and 67. The gear wheels 65, 66, 67 cause the shafts 59 and 60 to rotate in the opposite direction to, but at the same speed as, the crankshaft 53. The shafts 63 and 64 are provided with gear wheels 69 and 70. Gear wheels 69 and 70 together with gear wheel 65 and 66 cause shafts 63 and 64 to rotate in opposite directions to each other and at twice the speed as crankshaft 53. Each of the balance weights 57 and 58 has a mass equal to one half of that of balance weight 56. The masses of balance weights 61 and 62 are equal and much smaller than that of balance weight 56.

The balances weights 56, 57 and 58 together balance the primary shaking forces which arise as a result of movement of the member 52 without introducing a primary shaking moment. The balance weights 61 and 62 balance the secondary shaking forces which arise as a result of movement of member 52. The unsymmetrical arrangement of weights 61, 62 introduces a secondary moment.

Balance mechanisms of the Lanchester type as exemplified in FIGS. 4 to 6 suffer from disadvantages which are similar to those of the balance mechanisms of FIGS. 2 and 3. The balance weights increase the required capacities of the main motor, transmission, clutch and brake of the machine in which they are installed. Also, the ideal positions of the rotating shafts which carry the balance weights may be inconvenient and, sometimes, it may be necessary to provide a chain of gear wheels to drive the shafts from the crankshaft. A further disadvantage is that gear drives are noisy and prone to backlash and wear.

SUMMARY OF THE INVENTION

Accordingly, it is an object of this invention to provide a new or improved balance mechanism for a press machine.

According to this invention, there is provided a press machine comprising a frame, a ram mounted on the frame for reciprocating movement along an operating axis, a crankshaft, means for rotating the crankshaft, a transmission mechanism connected between the crankshaft and the ram, said transmission mechanism including at least one connecting rod, and a balance mechanism for balancing at least some of the shaking forces arising in said press machine, in which said balance mechanism includes a rotatably mounted balance mechanism shaft which is separate from the crankshaft, a first balance weight eccentrically mounted on the crankshaft, a second balance weight eccentrically mounted on said balance mechanism shaft, an electric motor for rotating the balance mechanism shaft, and means for controlling said electric motor so that said balance mechanism shaft rotates at the same speed as the crankshaft.

According to another aspect of this invention, there is provided a press machine comprising a frame, a ram mounted on the frame for reciprocating movement along an operating axis, a crankshaft, means for rotating the crankshaft, a transmission mechanism connected between the crankshaft and the ram, said transmission mechanism including at least one connecting rod, and a balance mechanism for balancing at least some of the shaking forces arising in said press machine, in which said balance mechanism includes a pair of rotatably mounted balance mechanism shafts which are separate from the crankshaft, a pair of balance weights each of which is eccentrically mounted on a respective one of said balance mechanism shafts, means for rotating said balance mechanism shafts, and means for controlling said means for rotating said balance mechanism shafts so that said balance mechanism shafts rotate at the same speed as the crankshaft.

With the balance mechanism of this invention, because there is no need to provide a mechanical transmission between the balance mechanism shafts and the crankshaft, these shafts can be placed in convenient, and often ideal, locations. As at least one of the shafts which carry balance weights is driven and braked independently from the main drive motor, there is no need to uprate the main drive motor, main transmission, clutch or brake for the balance weights carried by such shafts.

BRIEF DESCRIPTION OF THE DRAWINGS

This invention will now be described in more detail, by way of example, with reference to the accompanying drawings in which.

DETAILED DISCUSSION OF PREFERRED EMBODIMENTS

Figure 7:
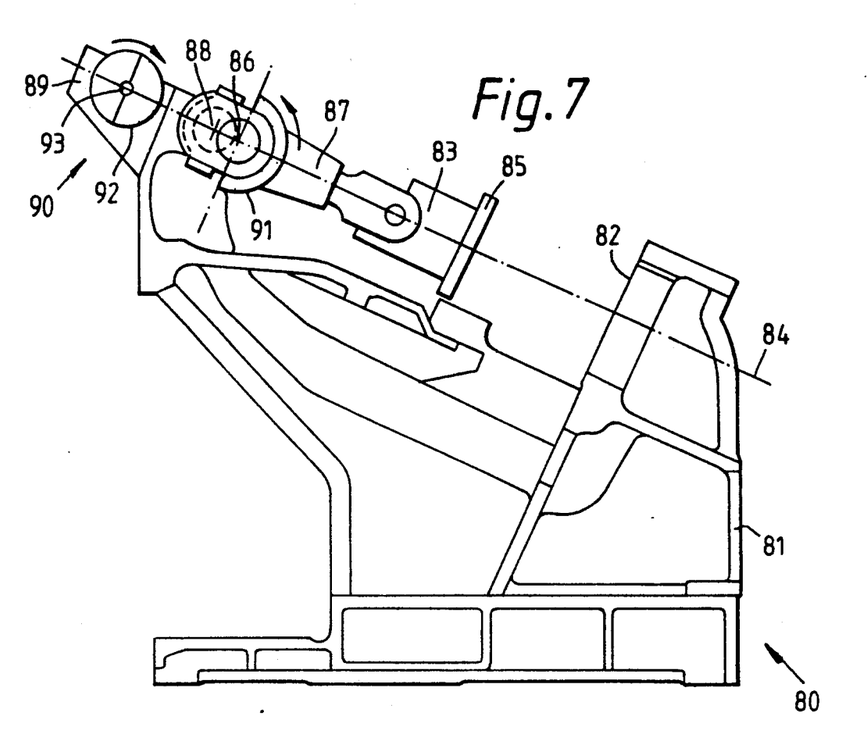
FIG. 7 is an elevational view of a press machine provided with a balance mechanism embodying this invention.
Figure 8:
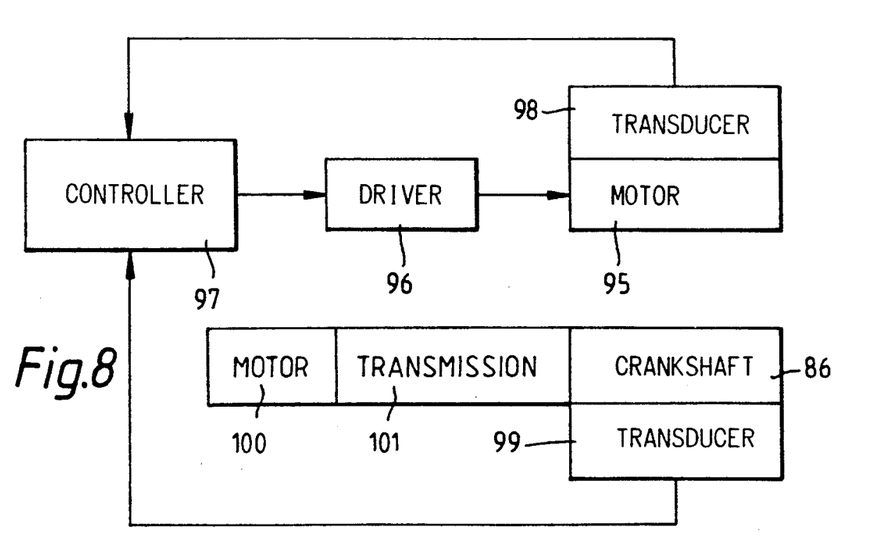
FIG. 8 is a block diagram of the control system for the balance mechanism shown in FIG. 7.

Referring now to FIG. 7 there is shown a press machine 80 for forming workpieces to a desired shape by a pressing operation. The press machine 80, which is of well known construction, has a frame 81 provided with a table 82 on which, in use, a die is mounted. The press machine 80 also has a ram 83 mounted for reciprocating sliding movement along an operating axis 84. The ram 83 has a holder plate 85 which, in use, carries a punch. The ram 83 is driven from a crankshaft 86 via a connecting rod 87. Thus, the connecting rod 87 forms a transmission mechanism for connecting the crankshaft 86 to the ram 83. The connecting rod 87 is pivoted to the crankshaft 86 about an axis 88. As shown in FIG. 8, crankshaft 86 is driven by a main drive motor 100 via a transmission system 101 of pulley wheels and belts.

In each cycle of the press machine 80, a workpiece is placed on a die positioned on the table 82. As a result of movement of the ram 83, the workpiece is pressed to the desired shape between the die and a punch mounted on holder plate 85.

During operation of the press machine 80, shaking forces arise primarily due to the reciprocating movement of ram 83. In order to balance part of these shaking forces, a balance mechanism 90 is provided and includes a balance weight 91 mounted eccentrically on the crankshaft 86. More specifically, the balance weight 91 is mounted at a position which is diametrically opposite to the pivotal axis 88 of connecting rod 87. The balance mechanism 90 also includes a balance weight 92, which is eccentrically mounted on a shaft 93. The shaft 93 is located on the operating axis 84 on the opposite side of the crankshaft 86 from the ram 83. The shaft 93 is itself rotatably mounted on a bracket 89 secured to the press machine. Although not shown in FIG. 7, the shaft 93 is rotated by an electric motor.

Referring now to FIG. 8, there is shown the control system for the electric motor which rotates shaft 93. In FIG. 8, the electric motor is indicated by reference numeral 95. The control system comprises a driver 96 which supplies current to the motor 95 and a controller 97 which supplies a control signal to driver 96. The motor 95 is provided with a transducer 98 which senses the rotational position of shaft 93 and supplies a feedback signal to controller 97. Crankshaft 86 is also provided with a transducer 99 which senses its rotational position of the crankshaft and supplies another feedback signal to controller 97.

In operation, the controller 97 controls motor 55 so that shaft 93 rotates at the same speed as, but in the opposite direction to, crankshaft 86. The controller 97 also controls the timing of motor 95 so that the balance weight 92 crosses the axis 84 of ram 83 at the same time as balance weight 91. Consequently, balance weights 91 an 92 generate sinusoidal shaking forces which are in phase with each other along the axis 84. The shaking forces generated by balance weights 91 and 92 are in opposition to the shaking forces generated by ram 83, crankshaft 86 and connecting rod 87. The masses of balance weights 91 and 92 are chosen so as to balance the primary shaking forces generated by ram 83, crankshaft 86 and connecting rod 87 along axis 84. The secondary shaking forces generated by ram 83 and connecting rod 87 along axis 84 are not balanced. However, as these secondary shaking forces are small compared with the primary forces, this lack of balancing is tolerable.

The balance weights 91 and 92 also generate sinusoidal shaking forces in a direction which is perpendicular to the axis 84. These shaking forces will be in opposite directions and consequently there will be no significant overall shaking force in a direction perpendicular to axis 84. However, as the axes of the crankshaft 86 and shaft 93 are spaced from each other along the axis 84, there will be an overall shaking moment generated by balance weights 91,92. As the axes of crankshaft 86 and shaft 93 are close together, the shaking moment will be tolerable except at very high operating speeds.

The masses of balance weights 91 and 92 are not equal for three reasons. Firstly, the balance weight 91 has to balance crankshaft 86 and part of connecting rod 87. Secondly, the shapes, and consequently the eccentricities, of balance weights 91 and 92 are different. The difference in the eccentricities dictates a difference in the masses. Thirdly, there will be a small shaking force generated by the connecting rod 87 in a direction perpendicular to axis 84. This shaking force may be neglected. Alternatively, compensation may be provided by increasing the mass of balance weight 91 while decreasing the mass of balance weight 92.

Figure 9:
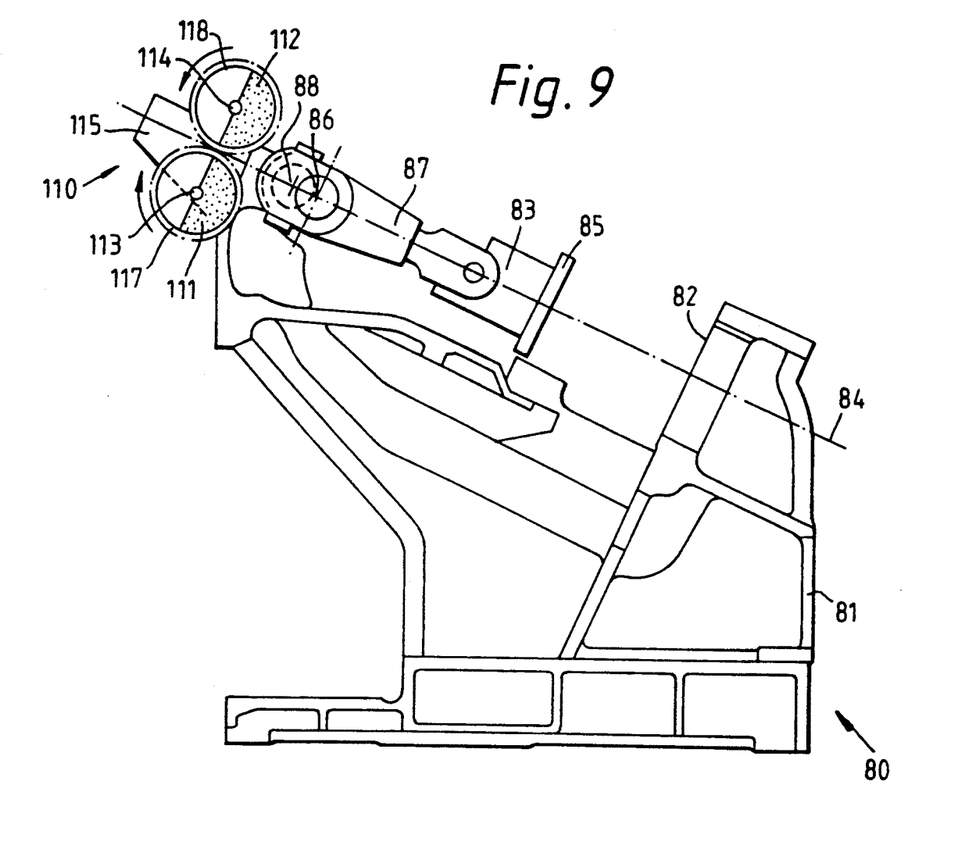
FIG. 9 is an elevational view of the press machine of FIG. 7 provided with another balance mechanism embodying this invention.

Referring now to FIG. 9, there is shown another balance mechanism 110 for the press machine 80. As will be explained below, the balance mechanism 110 provides the advantage over balance mechanism 90 that it does not generate a shaking moment, and does not require an uprating of the transmission and brake.

The balance mechanism 110 comprises a pair of balance weights 111,112 mounted eccentrically on a pair of shafts 113,114. The shafts 113,114 are mounted for rotation on a bracket 115 which is secured to the press machine 80. The shafts 113, 114 are disposed on the opposite side of the crankshaft 86 from the ram 83 and on mutually opposite sides of the operating axis 84. The shafts 113,114 are provided with meshing gear wheels 117,118. The shaft 113 is driven by an electric motor, not shown, and the gear wheels 117 and 118 cause the shaft 114 to rotate in the opposite direction to shaft 113.

The motor which rotates shaft 113 is controlled by a control system similar to that shown in FIG. 8. This control system causes the shafts 113,114 to rotate at the same speed as crankshaft 86. The control system also ensures that the balance weights 111,112 cross axes parallel to axis 84 when the ram 83 is at the extremities of its movement and so that the shaking forces generated by balance weights 111,112 oppose the shaking forces generated along axis 84 by ram 83. More specifically, the masses of balance weights 111,112 are chosen so as to balance the primary forces generated by ram 83, crankshaft 86 and connecting rod 87 along axis 84. By making the masses of balance weights 111,112 unequal, the primary shaking forces generated by connecting rod 87 perpendicular to axis 84 may also be balanced. As the axes of shafts 113,114 lie on a line which is perpendicular to axis 84, there will be no shaking moment.

By way of modification, in the balance mechanism 110 the gear wheels 117 may be omitted and a second electric drive motor may be provided for rotating shaft 114. With this modification, the control system would be arranged to control the motor which rotates shaft 114 and so as to ensure that shaft 114 rotates at the same speed as, but in the opposite direction to, shaft 113.

In the balance mechanism 90 shown in FIG. 7, shaft 93 is rotated by its own electric motor and there is no transmission between crankshaft 86 and shaft 93. This provides considerable freedom for the location of shaft 93. In order to minimize shaking moments, the shaft 93 should be located on axis 84 and as close as possible to crankshaft 86. As may be seen, the bracket 89 is located at the upper left hand end of the press machine where space is available and where there is no interference with the operation of the moving parts of the press machine. This also results in shaft 93 lying on axis 84 near to crankshaft 86. Likewise, in the balance mechanism 110 of FIG. 9, there is considerable freedom for the location of shafts 113 and 114. However shafts 113 and 114 should be spaced equally from axis 84. As may be seen, bracket 115 is also located at the upper left hand end of the press machine. This location is convenient and provides the correct spacing for shafts 113,114 relative to axis 84.

In the balance mechanism 110 shown in FIG. 9, as the shafts 113 and 114 are rotated by their own electric motor and, if necessary, can be braked by their own brake, there is not need to increase the rating of the main motor for crankshaft 86, or the associated transmission system, or any associated brake. In the case of the balance mechanism 90 shown in FIG. 7, the main motor for crankshaft 86, associated transmission and any brake need only be uprated for the balance weight 91. No uprating is needed for balance weight 92.

The maximum operating speed of a press machine is normally limited by the shaking forces which it generates. Because the balance mechanisms 90 and 110 reduce the shaking forces, they allow an increase in the maximum operating speed of press machine 80. In the case of balancing mechanism 110, it is anticipated that the maximum operating speed can be increased by 50%. In view of the shaking moment generated by balance mechanism 90, the increase in the maximum operating speed will be somewhat less than 50%.

Figure 10:
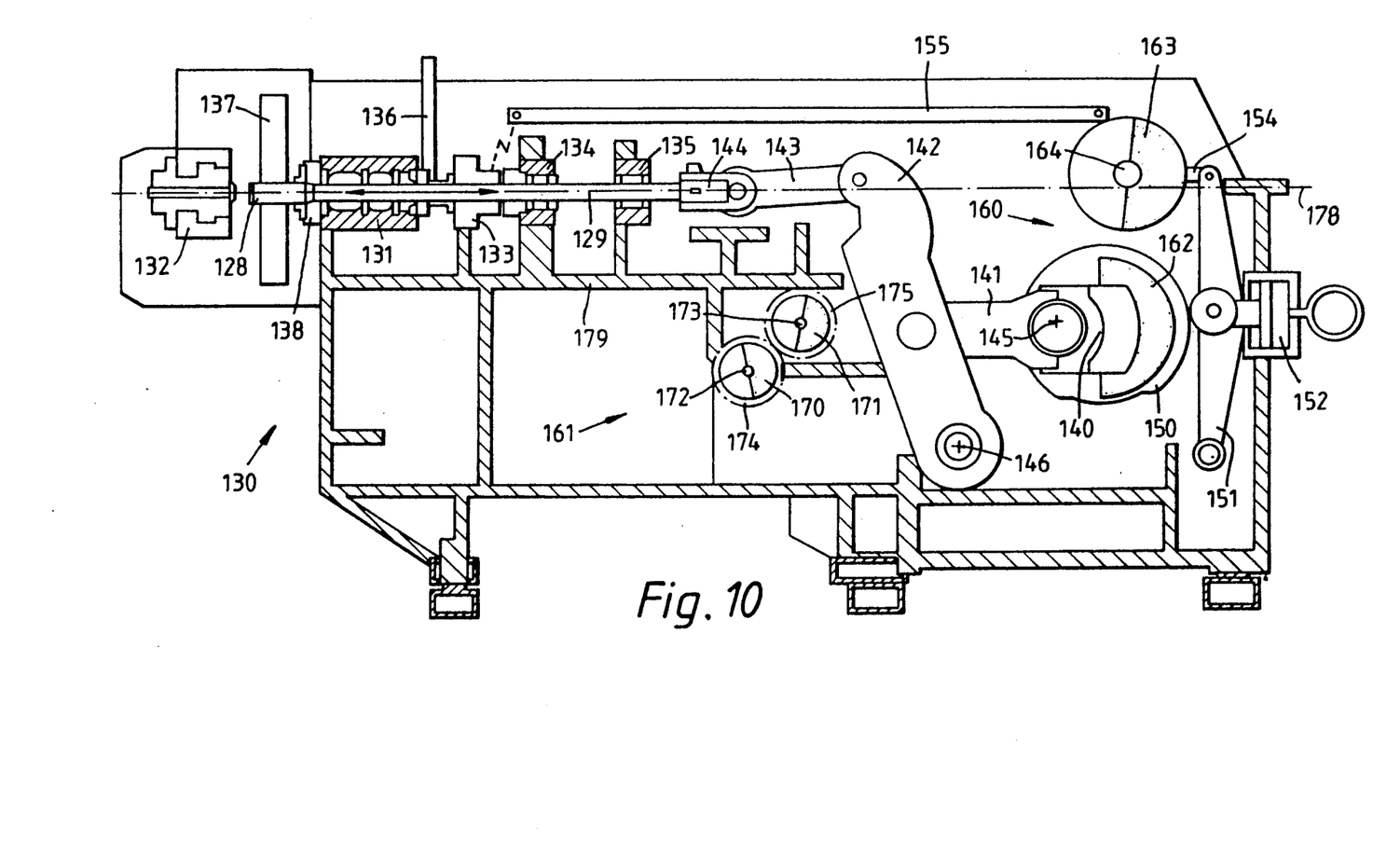
FIG. 10 is an elevational cross-sectional view of a press machine for making can bodies which is provided with a balance mechanism embodying this invention.
Figure 11:
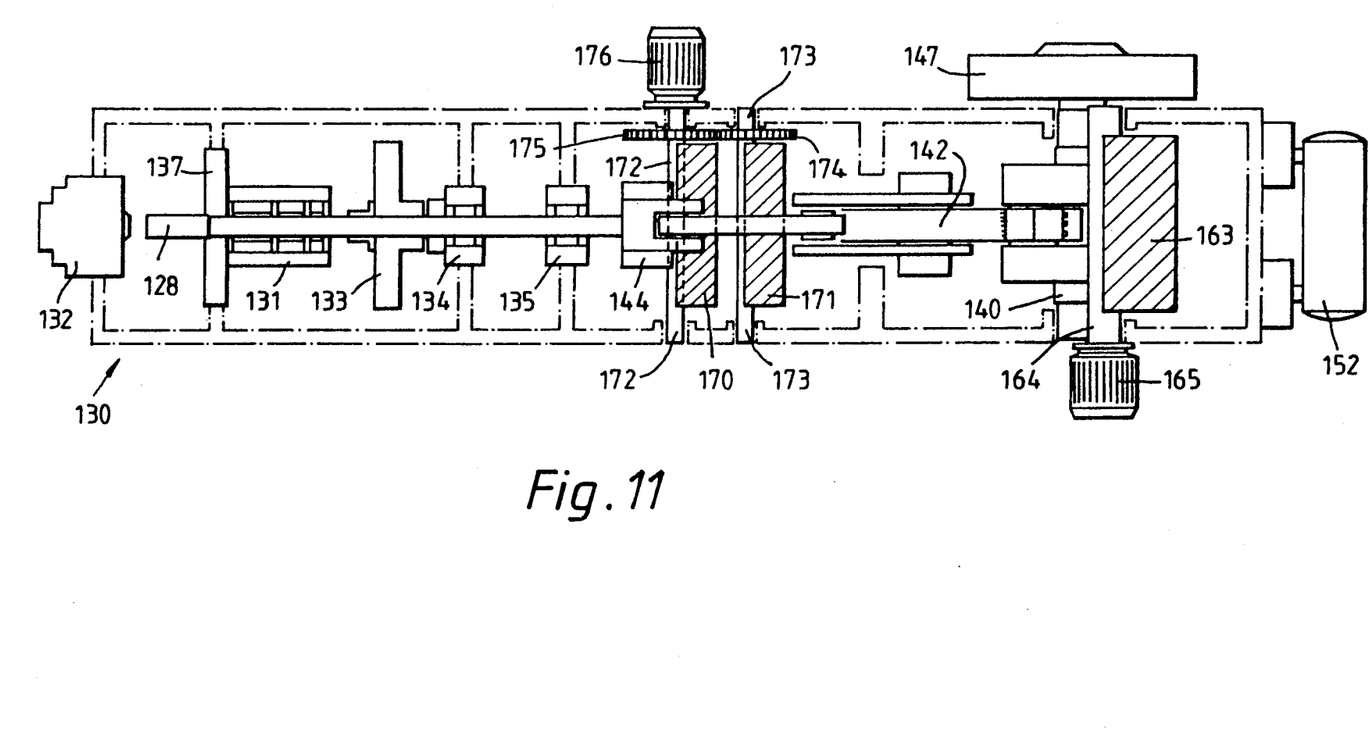
FIG. 11 is a plan view of the press machine of FIG. 10.

Referring now to FIGS. 10 and 11, there is shown a press machine 130 for making can bodies and which is provided with a balance mechanism. The press machine for making can bodies is of well known construction and will be described only briefly.

The press machine 130 makes metal can bodies of the type in which each can body comprises a cylindrical sidewall closed by an integral domeshaped end. The sidewall is provided with a flange in another machine. In well known manner, after the can body has been filled, it is closed by an end which is connected to the can body by a double seaming operation.

In the press machine 130, each can body is formed from a workpiece in the form of a shallow cup by a redrawing operation, a series of wall ironing operations and a doming operation. The forming components of the press machine 130 include a tool pack 131, a doming station 132 and a piston 133. The tool pack 131 contains a redrawing ring and three wall ironing rings. The workpieces are pushed through the tool pack 130 by a punch 128 which is mounted on a ram 129. The ram 129 is mounted for sliding movement along an operating axis 178 on a pair of bearings 134, 135. The bearing 134, 135 are mounted on a frame 179. The workpieces are supplied to the machine 130 by an infeed conveyor 136 and they are removed by an outfeed conveyor 137. Each can body is removed from punch 132 by stripper fingers 138. Each cup is initially held in position by the piston 133 which moves to the left, as shown in FIG. 10, for this purpose. The piston 133 carries part of the redraw tooling.

The ram 129 is connected to a crankshaft 140 by a primary connecting rod 141, a swing lever 142, a secondary connecting rod 143 and a slider block 144. The crankshaft 140 is rotated by a main electric motor 177 (shown in FIG. 12) via a transmission system and a flywheel 147. The connecting rod 141 is pivoted to the crankshaft 140 about an axis 145. The swing lever is pivoted to the frame of the machine 130 about a pivotal axis 146. The connecting rod 141 is connected between the crankshaft 140 and a position on the swing lever 142 intermediate its free end and pivotal axis 146. The connecting rod 143 is connected between the free end of swing lever 142 and slide block 144, and the slider block 144 is connected to the ram. As the crankshaft 140 rotates, the ram 133 is made to perform reciprocating movement. Thus, the connecting rods 141, 143, swing lever 142 and slider block 144 form a transmission mechanism for connecting the crankshaft 140 to the ram 133.

The piston 133 is driven from the crankshaft 140 via a mechanism which comprises a cam 150 on crankshaft 140, a lever 151, a cylinder 152, a link 154 and a push rod 155.

The balance mechanism for the press machine 130 comprises a primary arrangement 160 for balancing the primary shaking forces and primary shaking moment and a secondary arrangement 161 for balancing the secondary shaking forces and secondary shaking moment.

The primary arrangement 160 comprises a balance weight 162 mounted eccentrically on crankshaft 140 and a further balance weight 163 mounted eccentrically on a shaft 164. The shaft 164 and the crankshaft 140 are located on mutually opposite sides of the operating axis. The shaft 164 is rotatably mounted on the frame 179 of press machine 130. The shaft 164 is rotated by an electric motor 165.

The secondary arrangement 161 includes a pair of balance weights 170,171 mounted eccentrically and respectively on a pair of shafts 172,173. The shafts 172,173 are located on the same side of the operating axis as the crankshaft 140 and on the same side of the crankshaft as the ram 129. The shafts 172,173 are rotatably mounted on the frame 179 of press machine 130. The shafts 172, 173 are provided with gear wheels 174,175 which are meshed together. The shaft 172 is rotated by an electric motor 176.

Figure 12:
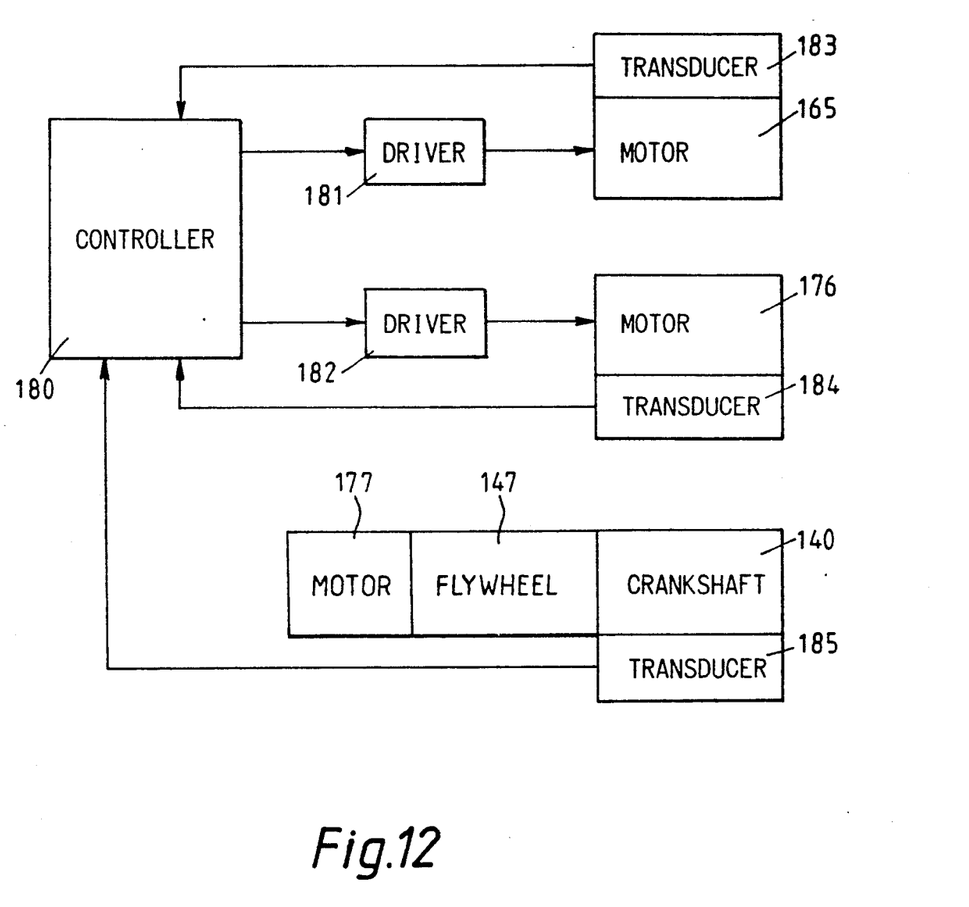
FIG. 12 is a block diagram of the control system for the balance mechanism of the press machine of FIG. 10.

Referring now to FIG. 12, there is shown the control system for motors 165 and 176. The control system includes a controller 180 which provides control signals to a pair of drivers 181,182. The drivers 181,182 provide drive current to the motors 165 and 176. The motors 165 and 176 are provided with transducers 183, 184 which detect the rotational positions of shafts 164 and 172. The transducers 183 and 184 provide feedback signals to the controller 180. The crankshaft 140 is also provided with a transducer 185 which detects its rotational position. Transducer 185 also provides a feedback signal to controller 180.

In operation, the controller 180 causes the shaft 164 to rotate at the same speed as, but in the opposite direction to, crankshaft 140. The controller 180 also causes the shaft 172 to rotate at twice the speed of crankshaft 140. The gear wheels 174 and 175 cause the shaft 173 to rotate at the same speed as, but in the opposite direction to, shaft 172. The controller 180 also controls the timing of rotation of shafts 164 and 172.

When designing the balance mechanism 160,161, its parameters may be calculated in the following way.

The various moving components of the machine 130 will give rise to an overall shaking force and an overall shaking moment. The magnitude and direction of the shaking force and also the magnitude of the shaking moment will vary in a periodic manner during each cycle of the machine. The magnitude and direction of the overall shaking force as well as the magnitude of the shaking moment are determined for a complete machine cycle. The overall shaking force is then resolved into a horizontal shaking force and a vertical shaking force.

By Fourier analysis, the horizontal shaking force is expressed as a fundamental sinusoidal force component at a frequency equal to the operating cycle frequency of machine 130 and a first harmonic sinusoidal force component at twice the cycle frequency. Higher harmonic components are ignored. In the same way, the vertical shaking force is expressed as a fundamental sinusoidal force component and a first harmonic force component. Likewise, the shaking moment is expressed as a fundamental shaking moment component and a first harmonic sinusoidal shaking moment component. In the general case, the higher harmonic components should be calculated and only ignored if found to be insignificant.

As has been mentioned above, the fundamental components of the shaking forces and shaking moment correspond to the primary shaking forces and primary shaking moment. These fundamental components are used to calculate values for the masses and eccentricities of balance weights 162 and 163, the timing of shaft 164 and also a position for the axis of shaft 164. Likewise, the first harmonic components of the shaking forces and shaking moment correspond to the secondary shaking forces and shaking moment. By using the first harmonic components of the shaking forces and shaking moment, there may be calculated values for the masses and eccentricities of balance weights 170 and 171, positions for the axes of shafts 172 and 173, and the timing of shaft 172. In passing, it should be noted that the masses of balance weights 162 and 163 are not necessarily equal. Likewise the masses of balance weights 170 and 171 are not necessarily equal.

It may be observed in FIG. 10 that the axes of crankshaft 140 and shaft 164 are spaced both horizontally and vertically. It is this combined horizontal and vertical spacing together with the relative mases of balance weights 162,163 and the timing of shaft 164 which enables the primary arrangement 160 to balance both the horizontal and the vertical primary shaking forces and the primary shaking moment. The axes of shafts 172 and 173 are spaced in a similar manner for a similar reason.

In operation, the balance mechanism 160,161 balances the major part of the shaking forces and shaking moment arising in machine 130. The effectiveness of the balance mechanism 160,161 may be appreciated by studying the graphs shown in FIGS. 13 to 16. Each of these graphs relates to a shaking force arising in the machine 130 when it is operated at 300 cycles per minute.

Figure 13:
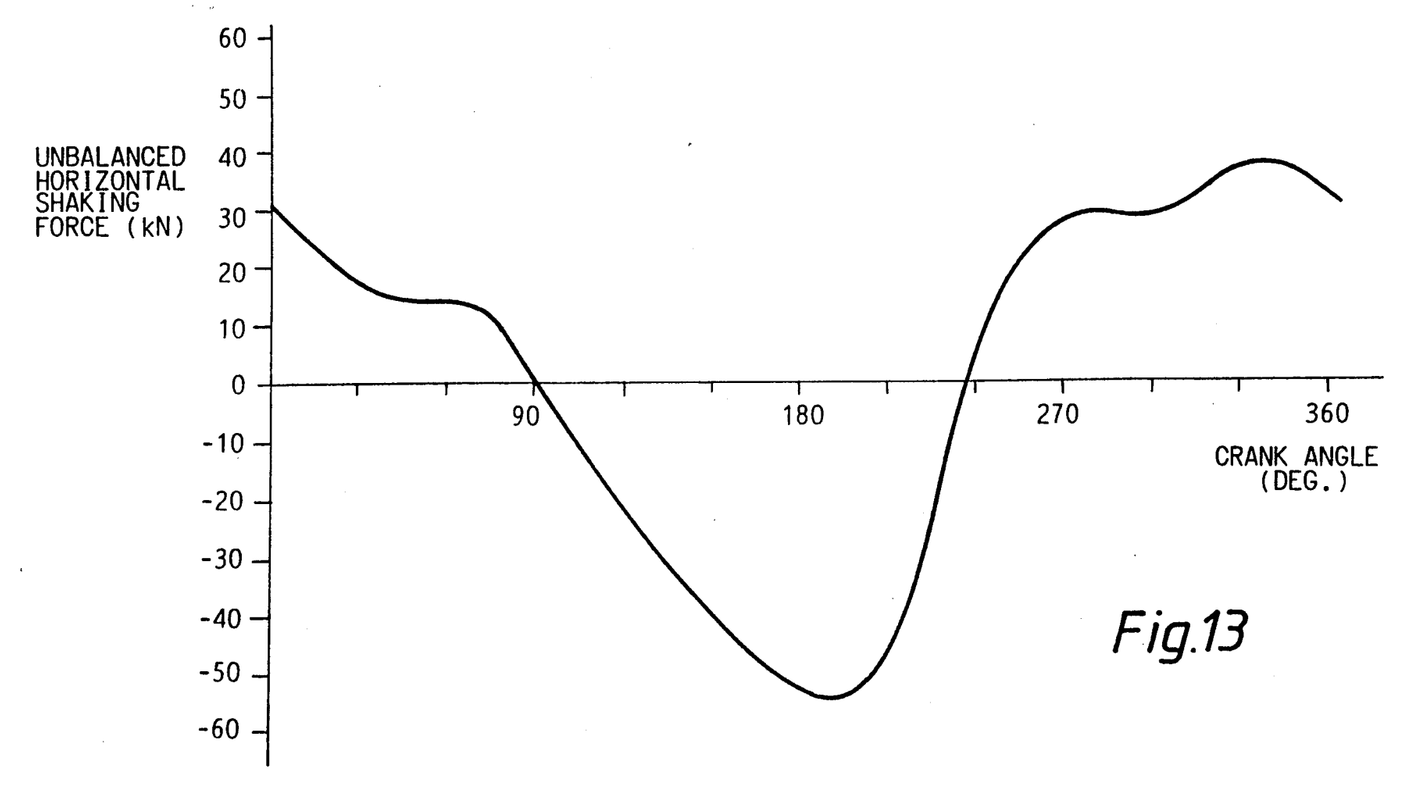
FIG. 13 is a graph of the horizontal shaking force which arises in the press machine of FIG. 10 in the absence of the balance mechanism.
Figure 14:
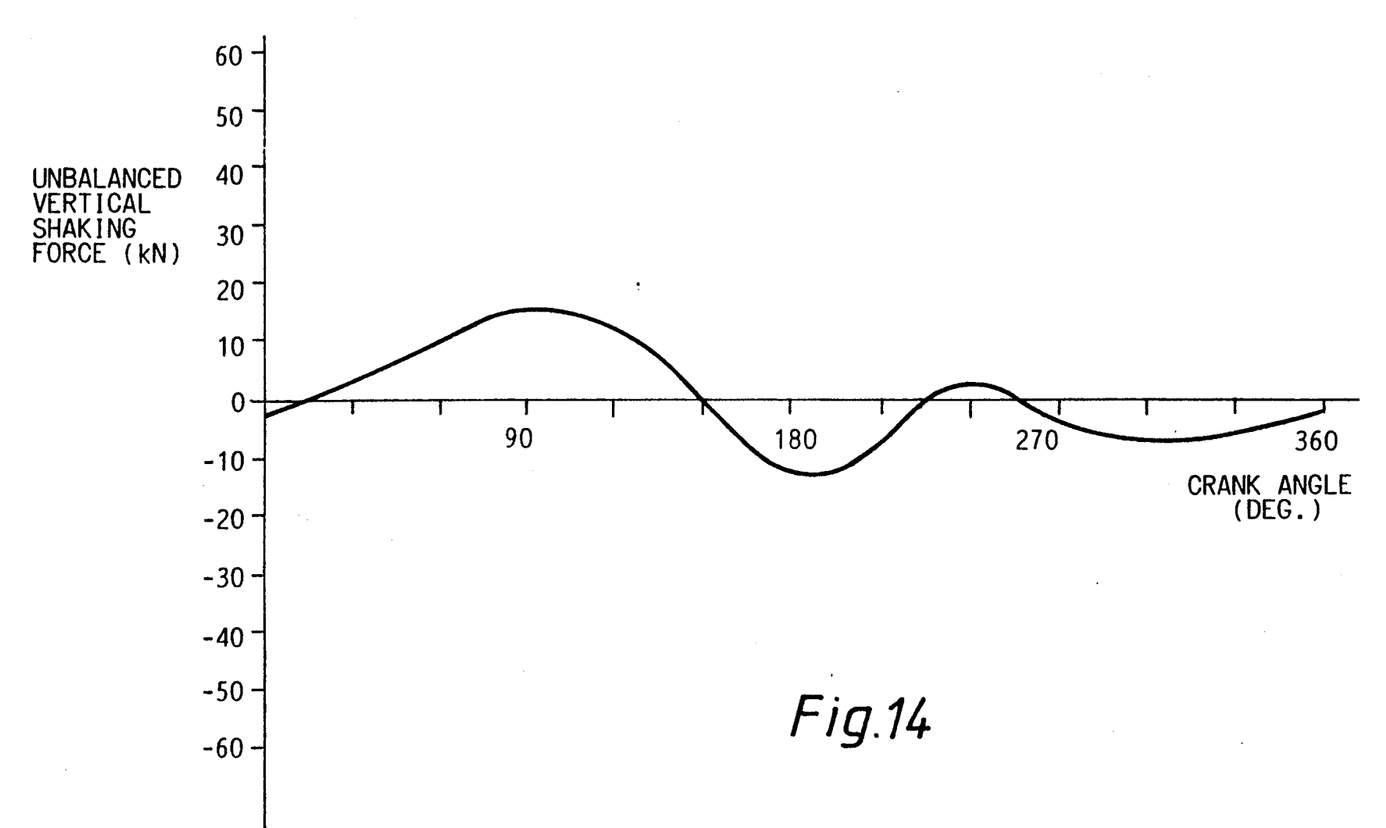
FIG. 14 is a graph of the vertical shaking force which arises in the press machine of FIG. 10 in the absence of the balance mechanism.
Figure 15:
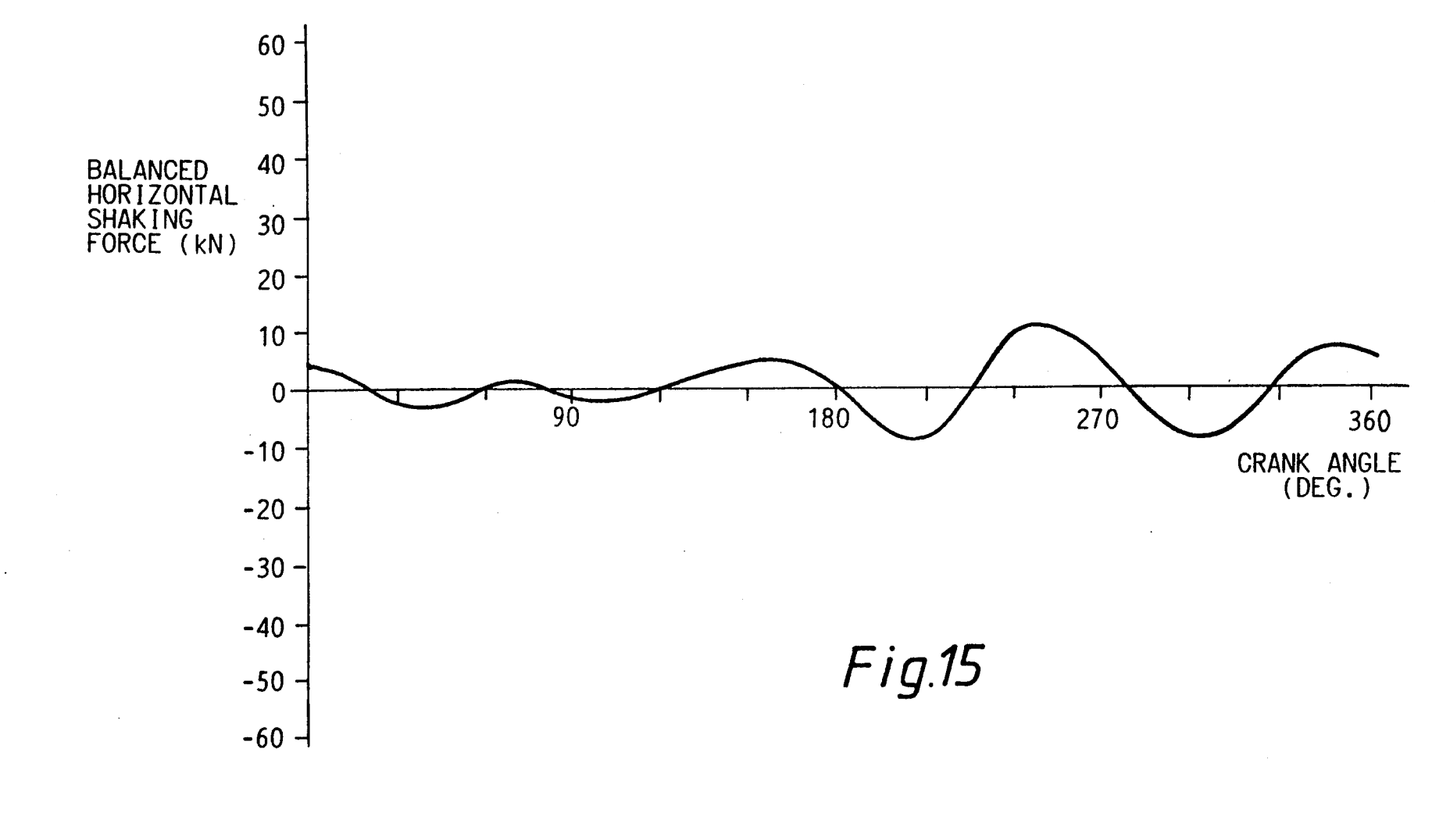
FIG. 15 is a graph of the horizontal shaking force which arises in the press machine of FIG. 10 when the balance mechanism is in operation.
Figure 16:
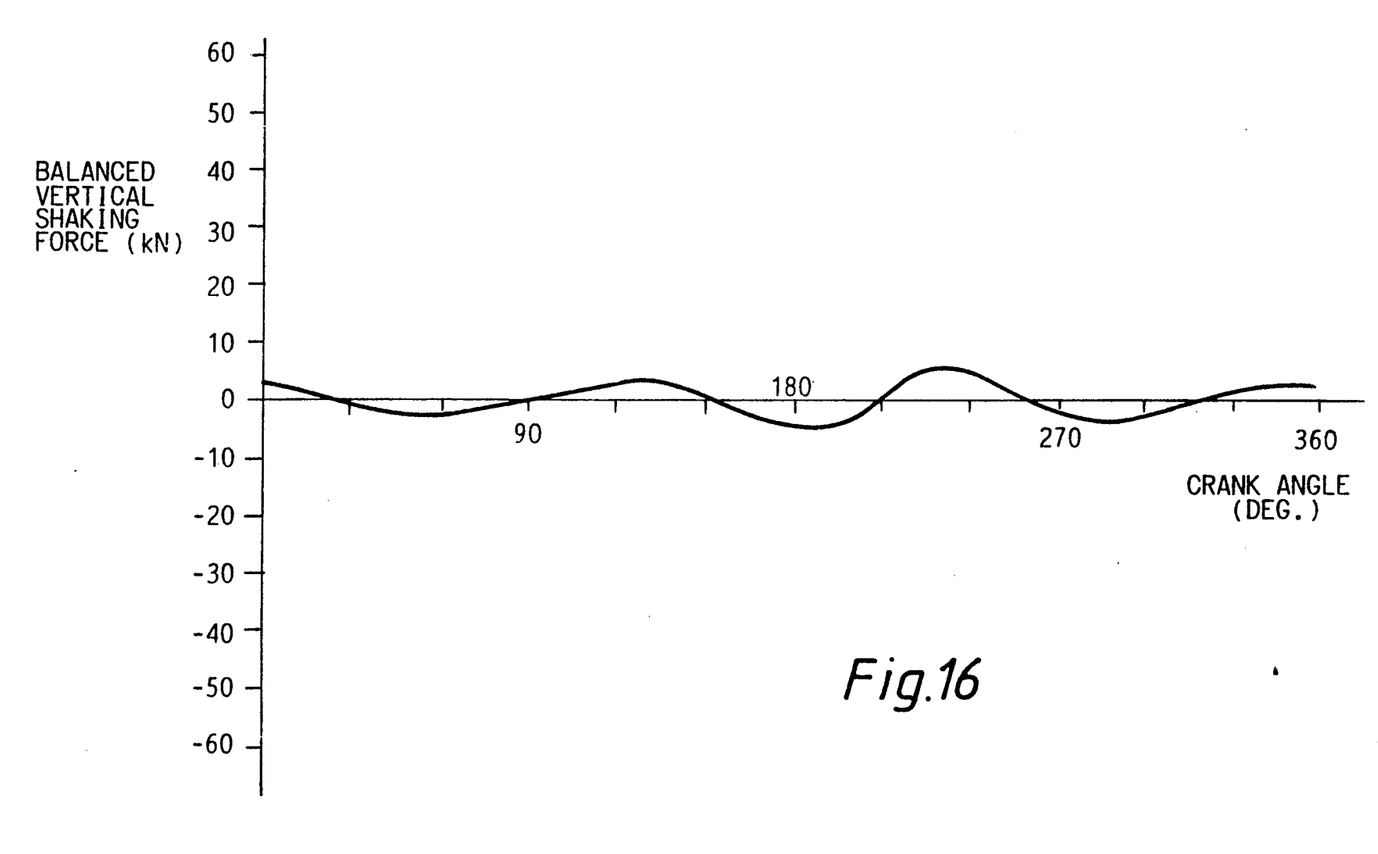
FIG. 16 is a graph of the vertical shaking force which arises in the press machine of FIG. 10 when the balance mechanism is in operation.

The graphs of FIGS. 13 and 14 show, respectively, the horizontal and vertical shaking forces which arise in the absence of the balance mechanism 160, 161. In contrast, the graphs of FIGS. 15 and 16 show, respectively, the horizontal and vertical shaking forces which arise with the balance mechanism 160,161 in operation. As may be seen, there is a substantial reduction in the shaking forces.

The maximum speed at which the machine 130 can be operated is restricted by the shaking forces. By using the balance mechanism 160,161 to reduce the shaking forces, the maximum speed can be increased. It is estimated that the speed can be increased by as much as 50%.

Because the shafts 164 and 172 are driven by individual electric motors, there is no mechanical transmission linking these shafts to the crankshaft 140. Consequently, the shafts 164,172 and 173 may be located at convenient positions. Also, because the balance masses 163,170 and 171 are driven by electric motors, their installation in the machine 130 does not require an increase in the rating of the motor 147 for the crankshaft 140.

Returning to FIG. 12, standard components may be used for the controller 180, drivers 181 and 182, motors 165 and 176, and transducers 183,184 and 185. By way of example, the controller 180 may comprises a type PTS-03 three channel controller manufacturered by Quin Systems Limited of 35 Broad Street, Wokingham, Berkshire, England. The two drivers 181,182 may comprise a two axis servo drive available from the Indramat Division of G L Rexroth Ltd, 4 Efland Place, Love Lane, Cirencester, Gloucester, England. The motor 165 and transducer 183 may together comprise a type MAC112D brushless servo motor provided with a 7:1 reduction gearbox and encoder and available from the Indramat Division of G L Rexroth Ltd. The motor 176 and transducer 184 may together comprise a type MAC112D brushless servo motor provided with a 3:1 reduction gearbox and encoder and available from the Indramat Division of G L Rexroth Ltd. The transducer 185 may comprises a type ROD426 encoder available from the Indramat Division of G L Rexroth Ltd.

Returning now to FIGS. 10 and 11, by way of modification in the secondary arrangement 161, the gear wheels 174 and 175 may be omitted and a separate electric motor provided for rotating shaft 173. With this modification, an additional driver is provided in the control system of FIG. 12 for this additional motor.

There have been described above three different balance mechanisms embodying the present invention. Many other embodiments are possible within the scope of this invention. The design of a balance mechanism will depend upon the application for which it is required. For example, in the balance mechanism 110 shown in FIG. 9, there is no provision for balancing the secondary forces. If it were desired to balance the secondary forces, this could be achieved by adding an arrangement similar to the secondary arrangement 161 shown in FIG. 10.

There is a difference, which should be noted, between the type of balance mechanism shown in FIGS. 7 and 10, and the type of balance mechanism shown in FIG. 9. In the balance mechanism shown in FIG. 7, the balance weight 91 is mounted on an existing shaft, namely crankshaft 86, of the press machine. Likewise, in FIG. 10, balance weight 162 is mounted on an existing shaft, namely crankshaft 140. Thus, in the machines of both FIGS. 7 and 10, an existing shaft is used to rotate one of the balance weights. In contrast, in the balance mechanism shown in FIG. 9, new shafts, namely shafts 113,114, are provided for both balance weights 111,112. Thus, existing shafts of the press machine 80 are not used to rotate the balance weights.

We claim:

1. A balanced press machine including a press machine generating shaking forces at a frequency equal to the frequency of operation of said press machine and a balance mechanism for balancing at least a portion of said shaking forces, said press machine comprising:
   a frame,
   a tool supported on said frame,
   a ram mounted on the frame for reciprocating movement along an operating axis towards and away from the tool,
   a crankshaft,
   means for rotating the crankshaft, and
   a transmission mechanism connected between the crankshaft and the ram, said transmission mechanism including at least one connecting rod, and
said balance mechanism comprising:
   a pair of rotatably mounted balance mechanism shafts which are separate from the crankshaft,
   a pair of balance weights each of which is eccentrically mounted on a respective one of said balance mechanism shafts,
   means for rotating said balance mechanism shafts, and
   means for controlling said means for rotating said balance mechanism shafts so that said balance mechanism shafts rotate at the same speed as the crankshaft wherein said controlling means includes:
   first sensing means for sensing the rotational position of said crank shaft;
   second sensing means for sensing the rotational position of at least one of said pair of balance mechanism shafts; and
   control means, responsive to said first and second sensing means, for controlling said means for rotating said balance mechanism shafts so that the balance mechanism shafts rotate at the same speed as the crankshaft, whereby rotation of said pair of balance weights balances at least some of the shaking forces.

2. A press machine as claimed in claim 1, in which said means for rotating said balance mechanism shafts comprises an electric motor for rotating one of said balance mechanism shafts and a gear mechanism for connecting said balance mechanism shafts together.

3. A press machine as claimed in claim 1, in which said means for rotating said balance mechanism shafts comprises a pair of electric motors each of which is arranged to rotate a respective one of said balance mechanism shafts.

4. A press machine as claimed in claim 1 in which said transmission mechanism comprises a single connecting rod, said balance mechanism shafts are both disposed on the opposite side of the crankshaft from the ram, and said balance mechanism shafts are disposed on mutually opposite sides of said operating axis.

* * * * *